United States Patent [19]

Osenbaugh

[11] 4,183,263

[45] Jan. 15, 1980

[54] DIFFERENTIAL MECHANISM

[75] Inventor: Carl D. Osenbaugh, Fort Wayne, Ind.

[73] Assignee: Dana Corporation, Toledo, Ohio

[21] Appl. No.: 883,923

[22] Filed: Mar. 6, 1978

Related U.S. Application Data

[63] Continuation of Ser. No. 701,581, Jul. 1, 1976, abandoned.

[51] Int. Cl.$^2$ .................. F16H 57/02; F16H 1/38
[52] U.S. Cl. ........................... 74/606 R; 74/710
[58] Field of Search ............... 74/710, 710.5, 711, 74/713, 606 R

[56] References Cited

U.S. PATENT DOCUMENTS

| | | | |
|---|---|---|---|
| 2,490,146 | 12/1949 | Miller, Jr. | 74/713 X |
| 2,510,996 | 6/1950 | Morgan | 74/713 |
| 2,808,740 | 10/1957 | Boden | 74/713 |
| 3,260,132 | 7/1966 | West et al. | 74/710 X |
| 3,323,388 | 6/1967 | Snoy et al. | 74/710 |
| 3,365,984 | 1/1968 | Musgrave | 74/713 |
| 3,896,684 | 7/1975 | Duer | 74/711 |

FOREIGN PATENT DOCUMENTS 2401430 7/1975 Fed. Rep. of Germany ............. 74/710

*Primary Examiner*—C. J. Husar
*Assistant Examiner*—Lance W. Chandler
*Attorney, Agent, or Firm*—Wilson, Fraser, Barker & Clemens

[57] ABSTRACT

A casing for and comprising an operative part of a differential mechanism for a vehicle drive. The casing consists of two identical halves, each half having walls defining a central, generally semi-annular space for differential pinions and gears, the walls being generated around the center line of the vehicle half-axles. Each half-casing also includes oppositely extending, tubular trunnion halves that also are semi-annular in shape and lie circumjacent the inner ends of the vehicle half-axles when the unit is assembled. There is a radial aperture at the pole of each half-casing in the central portion thereof for the reception of an end of a radially extending journal pin for the differential pinions. Each half-casing has a semi-circular flange of diameter larger than the central portion of the casing half. When the two half-casings are assembled, a ring gear or crown wheel fits circumjacently to the central portions of the half-casings against and is secured to the flanges. Trunnion bearings fit over the trunnion halves. A "C" shaped ring snaps over the central casing portions and engages the ends of the journal pin which protrude through the polar apertures. The ring gear and trunnion bearings hold the half-casings together as a closed unit and the snap ring holds the journal pin in the casing.

4 Claims, 4 Drawing Figures

DIFFERENTIAL MECHANISM

CROSS-REFERENCE TO RELATED APPLICATION

This application is a continuation of U.S. Pat. application Ser. No. 701,581, filed July 1, 1976 and now abandoned, and is assigned to the assignee of said application.

BACKGROUND OF THE INVENTION

This invention relates to the field of differential mechanisms and, more particularly, to differential mechanisms of the type in which the casing enclosing the differential pinions and gears is rotated by the drive shaft of a powered vehicle.

It previously has been suggested that the casing for such a differential mechanism might be fabricated from opposed half-casings of identical shape and configuration. Such a casing has been utilized in a self-propelled rider vehicle, such as a power lawn mower, wherein wheel driving shafts extend from opposite sides of the differential and a chain driven sprocket is secured to the casing. The half-casings are held together in their assembled position by means of bolts extending through holes in flanges and bosses on each of the half-casings, the bolts having nuts threaded onto the ends thereof. Such a structure appears in U.S. Pat. No. 3,365,984 issued to O. Musgrave on Jan. 30, 1968.

All enclosed rotating differential casings must include suitable bearings between the axle housing and the differential casings and also interiorly of the casings for the differential gears and differential pinions. If the differential casing is to rotate, it must also have means for securing to the casing the ring gear or "crown wheel" to which power is applied by the vehicle drive shaft. In one prior art differential, the casing has oppositely extending journals carried in roller bearings which rotatably support the casing in the axle housing. The casing carries a ring gear which is engaged by a drive pinion for rotating the casing. Typically, the casing is cast in one piece with an access hole for inserting the pinion gears and the side or differential gears after which the access hole can be covered by a plate secured with bolts. Such a differential is disclosed in U.S. Pat. No. 3,896,684 issued to M. J. Duer on July 29, 1975.

One object of the present invention is to reduce the effort required to assemble the interior components in the one piece casing described above. Thus, with the present invention, the differential pinions can be positioned in one half-casing with the differential pinions and their mounting pin before the other half-casing is assembled therewith. This method of assembly results in a savings of time and money over the prior art one piece casing in which the pinions and gears were inserted one at a time and held in place while the half-axles were inserted through the journals and into the gears.

Another object of the present invention is to reduce the components and the time required to assemble the casing. The above-described prior art casing fabricated from opposed half-casings requires a plurality of fasteners to hold it together. The present invention eliminates these fasteners by utilizing the trunnion bearings and the ring gear to hold the half-casings together. The present invention also eliminates the cover and associated fasteners of the above-described one piece casing.

DESCRIPTION OF THE PREFERRED EMBODIMENT

A differential mechanism embodying the invention comprises two half-casings 10 and 11. The half-casings 10 and 11 are identical to each other and are assembled together by abutting flat diametric surfaces. Therefore, in further description of the half-casings 10 and 11, the component parts of the half-casings will be described interchangeably.

Figure 1:
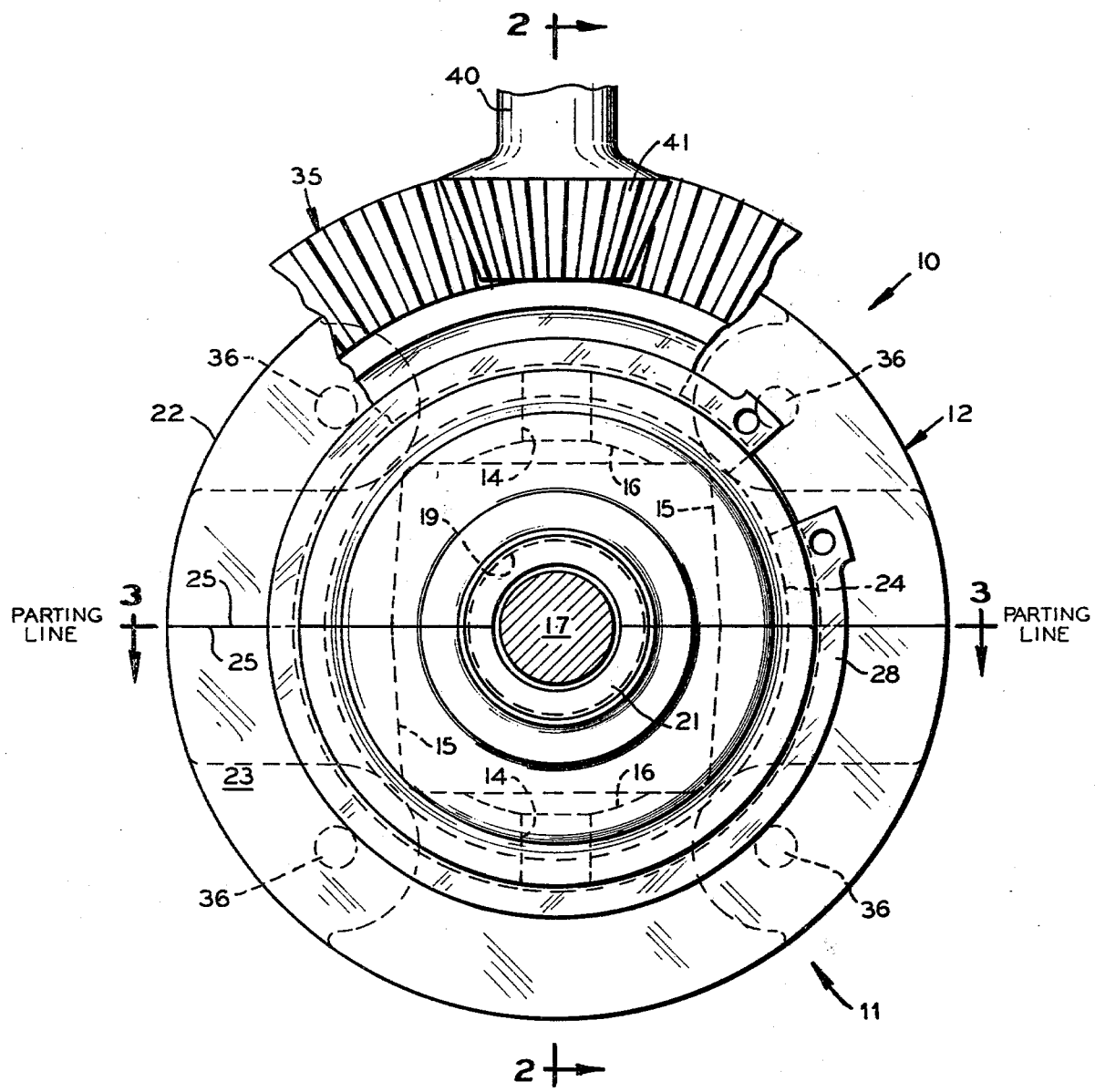
FIG. 1 is a view in end elevation of a differential mechanism embodying the invention with some parts being broken away, the view not showing the casing mounting bearings or axle housing.
Figure 2:
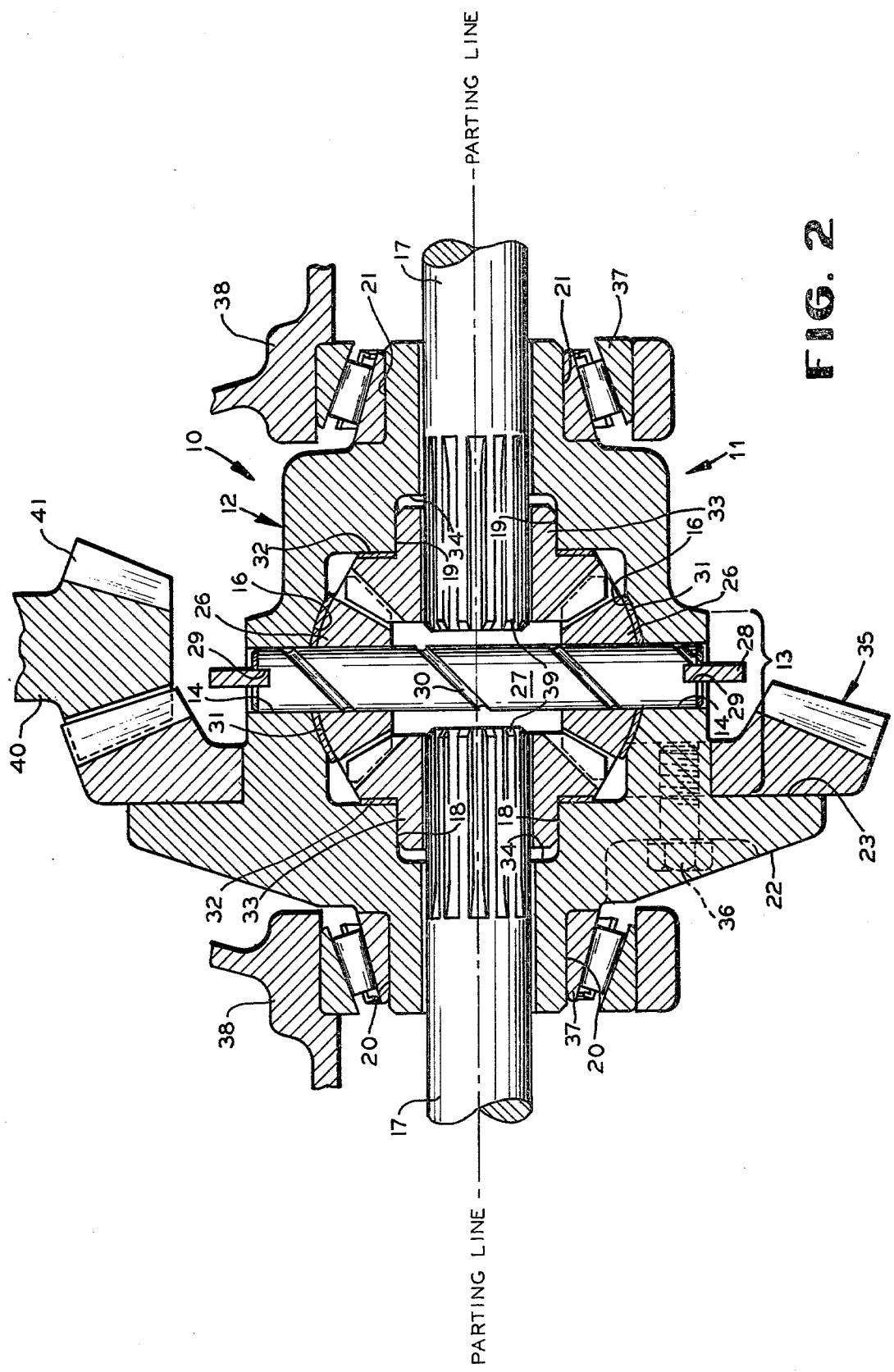
FIG. 2 is a vertical sectional view taken along the line 2—2 of FIG. 1 and showing the differential gears and pinions, the pinion mounting pin, the trunnion bearings and the ring gear and drive shaft as well as the inner ends of the vehicle half-axles, some parts being shown in section and some parts being broken away.
Figure 3:
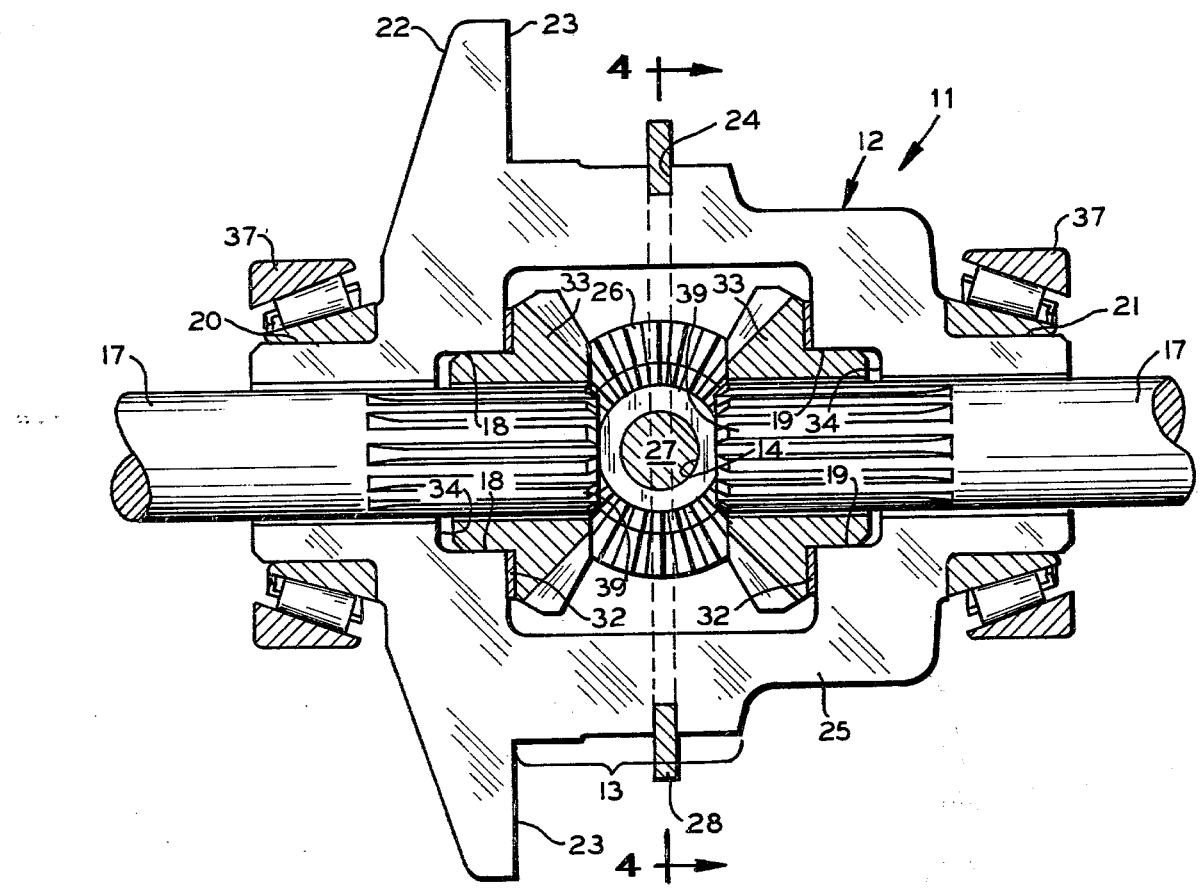
FIG. 3 is a horizontal sectional view taken along the line 3—3 of FIG. 1 and showing one of the half-casings according to the invention in elevation with some associated parts being shown in section.
Figure 4:
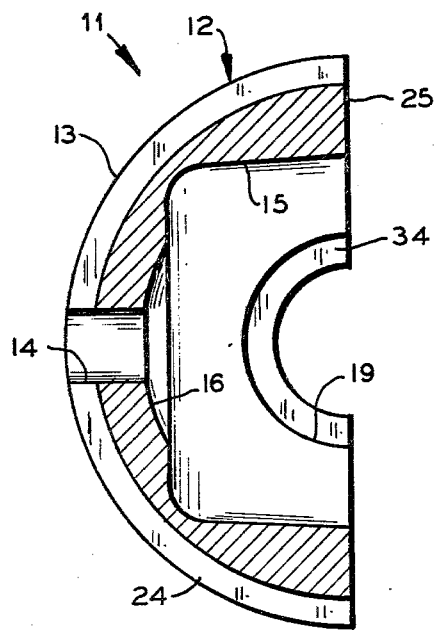
FIG. 4 is a vertical sectional view of the half-casing taken along the line 4—4 of FIG. 3 with the associated parts removed.

Each half-casing 10 or 11 has a main body 12 which includes a central portion 13, indicated generally by the bracket 13 in FIGS. 2 and 3. The exterior of the central portion 13 is semi-cylindrical and is shown in section in FIG. 4. The central portion 13 has a polar aperature 14 and it defines an open interior space 15 which has a circular polar zone 16 concentric with the aperture 14. The polar apertures 14 extend radially relative to the axial center line of the half-casing and to the center lines of a pair of half-axles 17 shown in part in FIGS. 2 and 3.

Each half-casing also has a pair of semi-circular recesses 18 and 19 (see also FIG. 4) which are concentric with the half-casings and a pair of oppositely extending tubular semi-annular trunnion halves 20 and 21. A larger semi-annular flange 22 is located at one side of the central portion 13 and has an inner face 23 lying in a radial plane. A circumferentially extending groove 24 intersects the polar aperture 14 and extends around the cylindrical surface of the central portion 13 of the body 12. Each of the two half-casings 10 and 11 has a flat diametric surface 25 which surfaces abut each other when the half-casings are assembled to form a closed casing that is open axially from end to end with the polar apertures 14 aligned along a single diameter.

The operative elements of a differential mechanism according to the invention include two differential pinions 26 which are rotatable about a mounting pin 27 extending across the casing and protruding into the two polar apertures 14. The pin 27 is of such length that it extends sufficiently far toward the exterior of the half-casings 10 and 11 so that a snap ring 28 can be spread around the two half-casings and inserted into the groove 24 engaging in a cross slot 29 cut into each end of the mounting pin 27. The mounting pin 27 is shown as having a helical lubrication groove 30 formed in its surface.

The two differential pinions 26 have outer surfaces which are complementary to the polar zones 16 and a pair of spherical bushings 31 are positioned between the surfaces of the polar zones 16 and the outer surfaces of the differential pinions 26. Similarly, a pair of annular bushings 32 are positioned between the outer sides of a pair of differential gears 33 and a pair of radial surfaces 34 on the interior of the half-casings 10 and 11.

After the insertion of the bushings 31 and 32, the differential pinions 26, the differential gears 33 and the pinion mounting pin 27, but prior to the assembly of the snap ring 28, a large ring gear or "crown wheel" 35 is slid over the bodies of the half-casings 10 and 11 up to and against the radial inner faces 23 of the flanges 22.

After the ring gear 35 has been positioned circumjacently the two half-casings 10 and 11 and against the flanges 22, it is secured in position by a plurality of machine screws 36. The snap ring 28 is then inserted in place and the two half-casings 10 and 11 are "unitized" for purposes of handling and eventual assembly into the vehicle upon which the differential mechanism is to be used.

The half-trunnions 20 and 21 now form complete supporting trunnions for the differential casing comprising the two half-casings 10 and 11. The outer surfaces of the now complete trunnions can then be turned to the correct diameter to receive a pair of trunnion bearings 37 which, in turn, are mounted in and supported by a pair of axle housings fragmentarily indicated by the reference numbers 38. The inner ends of the opposed half-axles 17 are inserted into the open centers of the differential gears 33 to which they may be driveingly connected, for example, cooperating with a plurality of serrations 39 or similar means. The vehicle also will have a main drive shaft 40 and a drive pinion 41 which is engaged with the ring gear 35 upon complete assembly of the vehicle.

In summary, the present invention concerns a differential mechanism for a vehicle drive including a hollow casing consisting of two identical half-casings, each of the half-casings having a body consisting of a central portion that defines a space for differential pinions and gears that is generated around a center line of oppositely extending vehicle half-axles and that has a semi-cylindrical exterior, a tubular half-trunnion extending co-axially at each end of the central portion, a radial aperture at the pole of the central portion and a semi-annular ring gear mounting flange on the exterior of the half-casing adjacent the semi-cylindrical portion thereof. The differential mechanism also includes a differential pinion mounting pin extending across the center line of the half-axles with its ends protruding into the polar apertures when the casing is assembled, a pair of differential pinions on the mounting pin, a pair of differential gears positioned interiorly of the assembled casing and meshed with the pinions, trunnion bearings circumjacent the trunnions formed by the half-trunnions when the casing is assembled and a ring gear closely circumjacent the cylindrical exterior of the assembled casing and drivingly connected to the mounting flange. The two half-casings are held in assembled relationship by the trunnion bearings and the ring gear. A snap ring engages a groove circumjacent the half-casings and engages the ends of the pinion mounting pin to prevent rotation thereof. The snap ring can also be used to hold the half-casings together during handling and shipment after the differential pinions and gears have been installed but before the trunnion bearings and ring gear have been mounted.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. A differential mechanism for a vehicle drive, said mechanism comprising in combination:
   (a) A hollow casing consisting of two identical half-casings, each of said half-casings having a body which consists of:
     (1) a central portion that defines a space for a pair of differential pinions and for semi-circular halves of a pair of differential gears, said central portion being generated around the center line of oppositely extending vehicle half-axles and having a semi-cylindrical exterior,
     (2) a tubular half-trunnion extending co-axially with and at each end of said central portion,
     (3) a radial aperture at the pole of said central portion, and
     (4) a semi-annular ring gear mounting flange on the exterior of said half-casing adjacent the semi-cylindrical portion thereof;
   (b) a differential pinion mounting pin extending across the center line of the half-axles with its ends protruding into said radial polar apertures of said half-casings when said casing is assembled;
   (c) a pair of differential pinions on said mounting pin;
   (d) a pair of differential gears meshed with said pinions and positioned interiorly of said assembled casing;
   (e) a pair of trunnion bearings each circumjacent a trunnion formed by said half-trunnions when said casing is assembled; and
   (f) a ring gear closely circumjacent the cylindrical exterior of the assembled casing formed by said semi-cylindrical exteriors and drivingly connected to said mounting flange, whereby said two half-casings are held in assembled relationship by said trunnion bearings and said ring gear.

2. A differential mechanism according to claim 1 including means for preventing rotation of said pinion mounting pin.

3. A differential mechanism according to claim 2 wherein said rotation preventing means is a snap ring circumjacent said half-casings and engaged with said ends of said pinion mounting pin.

4. A half-casing for a differential mechanism according to claim 1 in which the interior surface of said central portion of said body has a spherical polar cap configuration surrounding said radial polar aperture therein and said differential pinions have outer surfaces complementary thereto.

* * * * *